July 19, 1960    S. YANDO    2,945,984
PIEZOELECTRIC DEVICE
Filed July 17, 1959
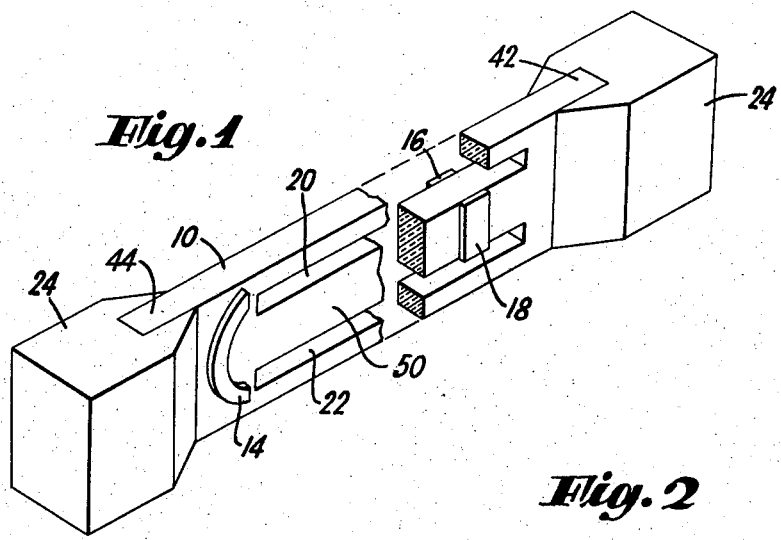
*Fig. 1*
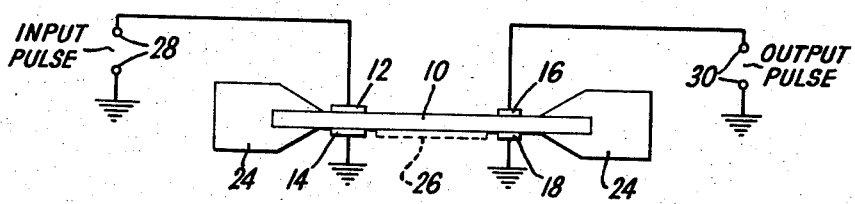
*Fig. 2*
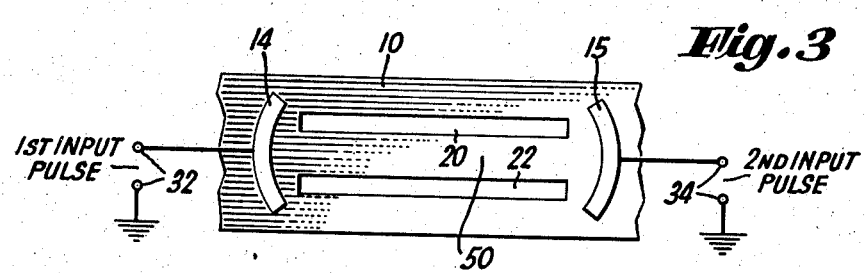
*Fig. 3*
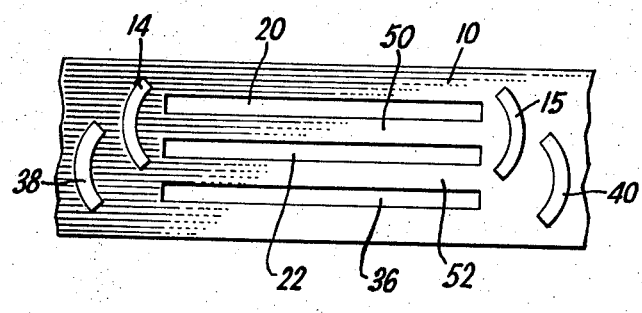
*Fig. 4*
INVENTOR
STEPHEN YANDO
BY 
ATTORNEY

United States Patent Office 2,945,984
Patented July 19, 1960

2,945,984
PIEZOELECTRIC DEVICE

Stephen Yando, Huntington, N.Y., assignor to Sylvania Electric Products Inc., a corporation of Delaware Filed July 17, 1959, Ser. No. 827,891

13 Claims. (Cl. 315—55)

My invention relates to piezoelectric devices.

I have invented a piezoelectric device which transforms an incoming electric pulse to a sharply localized travelling electric field of high intensity. As will be explained in more detail below, this device can be used as a signal delay line or as a signal switching element. Further, in another form of my device, an incoming electric pulse can be transformed into a moving spot of light which is sharply localized and is of high intensity.

In accordance with the principles of my invention, I provide a sheet of piezoelectric material. The sheet contains at least two separated parallel slots which extend in a given direction along a portion of the sheet intermediate opposite ends thereof. These opposite ends are terminated in such manner as to absorb, substantially without reflection, any incident elastic wave supplied thereto from the sheet.

First and second curved electrodes are secured in registration with each other to opposite surfaces of the sheet adjacent one of said ends, these electrodes having a focal point falling within that region of the sheet intermediate the slots.

When a pulse is applied between the first and second electrode, an elastic wave, accompanied by an electric field, propagates along the sheet. Due to the curvature of the electrodes and the presence of the slots, the wave is focused and confined within the region of the sheet intermediate the slots and the accompanying electric field is sharply localized and of high intensity.

In another form of my invention, third and fourth curved electrodes are secured in registration with each other to opposite surfaces of the sheet adjacent the other of the opposite ends, these electrodes also having a focal point falling within that region of the sheet intermediate the slots.

When a first pulse is applied between the first and second electrodes and a second pulse is applied between the third and fourth electrodes, first and second elastic waves, accompaned by first and second electric fields of high intensity, propagate in opposite directions from opposite ends of the sheet along the region of the sheet intermediate the slots. The two waves intersect at a point along this region. The separate electric fields are additive at this point of intersection, thus producing a sharply localized electric field of very high intensity. The position of the point of intersection is determined by the relative timing of the first and second pulses and can be shifted as desired by varying the timing.

Means, such as signal pick-off electrodes or an electroluminescent layer, are positioned adjacent the region of the sheet intermediate the slots and spaced apart from the electrodes. Such means respond to the single or summed electric fields to derive therefrom an electrical or a visual signal.

Illustrative embodiments of my invention will now be described with reference to the accompanying drawings wherein:

Fig. 1 is a partially cut away isometric view of one embodiment of my invention;

Fig. 2 is a plan view of the embodiment shown in Fig. 1;

Fig. 3 shows a front view of a modification of the embodiment of Fig. 1; and

Fig. 4 shows a front view of another modification of the embodiment of Fig. 1.

Referring now to Figs. 1 and 2, there is shown a sheet 10 of piezoelectric material; in this example, the material is a polarized ceramic composed of a sintered lead titanate-lead zirconate mixture. The sheet 10 is provided with first and second vertically displaced slots 20 and 22 which subtend a region 50 of the sheet and which extend horizontally intermediate ends 44 and 42 of sheet 10.

Each of these ends is terminated in such manner as to absorb, substantially without reflection, any incident elastic wave propagating in the sheet. In this example, this is accomplished by coating corresponding ends and immediately adjacent portions of sheet 10 with a material, such as lead, to provide terminations 24.

First and second narrow curved electrodes 12 and 14 are secured in registration with each other to opposite surfaces of sheet 10 adjacent end 44. These electrodes 12 and 14 have a focal point falling within region 50.

Third and fourth narrow straight signal pick-off electrodes 16 and 18 are secured to opposite surfaces of region 50 adjacent the end 42 of sheet 10.

When a voltage pulse is applied between the curved electrodes 12 and 14, an electric field proportional to the instantaneous value of the pulse is established between these electrodes. This field, due to the piezoelectric properties of sheet 10, produces a mechanical strain proportional to the electric field intensity. The strain produces a disturbance which is proportional to the time rate of change of strain and, consequently, is also proportional to the first time derivative of the applied pulse. This disturbance propagates along the sheet in the form of oppositely directed elastic waves travelling towards ends 44 and 42 of sheet 10. Each wave is accomplished by an electric field, the intensity of which is proportional to the disturbance.

The wave travelling toward end 44 is absorbed almost immediately in termination 24 and has no influence upon the operation of my device. The wave travelling toward end 42, due to the focusing action of the curved electrodes 12 and 14 and the wave confining action of slots 20 and 22, is sharply localized and is of high intensity. The field intensity for a given input pulse amplitude is determined by the ratio of the length of the electrode arc to the distance between adjacent slots. An illustrative ratio for example can be four or more.

As this wave passes between the signal pick-off electrodes 16 and 18, the electric field accompanying this wave produces a sharp, high intensity output pulse across these electrodes 16 and 18. The intensity of the output pulse is proportional to the electric field intensity. The output pulse is delayed in time with respect to the input pulse by the period required for the elastic wave to travel between the two sets of electrodes. (A more detailed description of this signal delay action will be found in my copending patent application Serial No. 738,469, now abandoned, filed May 28, 1958.)

Alternatively, as shown by the dotted section 26 in Fig. 2, electrodes 16 and 18 can be replaced by an electroluminescent layer in intimate engagement with region 50 of sheet 10. As the elastic wave propagates along region 50, the accompanying electric field produces a sharply localized spot of light of high intensity in the electroluminescent layer. This spot moves along the electroluminescent layer in synchronism with the travelling electric field. (This type of conversion of an elastic wave into a moving spot of light is described in more detail in my copending patent application Serial No. 776,980, filed November 28, 1958.)

Fig. 3 shows a device essentially similar to that of Figs. 1 and 2 except that two additional curved electrodes 15 are secured to opposite surfaces of sheet 10 adjacent end 42. One of these electrodes 15 is shown in the drawing. The other electrode (which is grounded) is not shown since it is secured to a surface not shown in Fig. 3. These additional electrodes have another focal point falling within region 50.

First and second voltage pulses having equal magnitudes are applied between electrodes 12, 14 and electrodes 15 respectively. Each pulse produces elastic waves in the same manner as previously discussed. More particularly, the first pulse produces a first wave which travels from electrodes 12, 14 along region 50 toward end 42. The second pulse produces a second wave which travels from electrodes 15 along region 50 toward end 44. These waves intersect at a point within region 50, the position of the point of intersection being determined by the relative timing of the first and second pulses. The electric fields accompanying these waves are additive at the point of intersection. Hence, a sharply localized electric field of high intensity is produced at the point of intersection.

When a plurality of narow straight electrode pairs are secured to opposite surfaces of region 50 at spaced apart positions, the point of intersection of the waves can be coincident with one or another electrode pair. Due to the piezoelectric action, when this coincidence occurs, an output pulse proportional to the summation of the individual electric fields will appear across the appropriate electrode pair. Thus, by suitably positioning the electrode pairs and suitably varying the timing of the first and second pulses, an output pulse can be produced successively across each electrode pair. As a consequence, the device of Fig. 3 can be used as a signal switching element. (A more detailed discussion of this type of element utilizing intersecting elastic waves, together with a circuit for varying the timing between first and second incoming pulses, can be found in my copending patent aplication, Serial No. 800,433, filed March 19, 1959.)

An electroluminescent layer can be substituted for narrow straight electrode pairs in the same manner as discussed in Figs. 1 and 2. (A more detailed explanation of the interaction of two intersecting elastic waves propagating along a piezoelectric sheet with an electroluminescent layer secured to the sheet to produce a moving spot of light will be found in my copending patent application, Serial No. 784,212, now Patent No. 2,917,669, filed December 31, 1958.)

Referring now to Fig. 4 it will be seen that by cutting one or more additional vertically displaced slots 36 in sheet 10 and appropriately adding additional electrodes, several delay lines, switching elements, or electroluminescent display devices can be incorporated in a single sheet 10. These several devices can function independently of each other. Each section of the sheet 10 constituted by electrodes and a corresponding region subtended by corresponding slots constitutes a separate device operable in the manner previously described. Each device is electrically independent and can be separately controlled.

Hence, for example, several different moving spots of light can be displaced simultaneously on the same sheet, one spot appearing in an electroluminescent layer associated with region 50, another spot appearing in another electroluminescent layer associated with region 52.

It will be apparent that when all electrodes on a single surface of sheet 10 are connected to a common potential point such as ground as shown in Figs. 1, 2, 3 and 4, these electrodes can be replaced by a single common electrode which is in registration with region 50 and does not cross any slot in the sheet. The term "curved electrode pair," as used herein, also is used to define the combination of one or more curved electrodes on one surface of sheet 10 together with a common electrode applied to the opposite surface of sheet 10.

What is claimed is:

1. A device comprising a sheet of piezoelectric material, said sheet having at least two separated parallel slots extending in a given direction along a portion of said sheet; and a pair of curved electrodes secured to opposite surfaces of said sheet in registration with each other and positioned adjacent one end of said sheet, said electrodes having a focal point falling within a region of said sheet intermediate said slots.

2. A device comprising a sheet of piezoelectric material, said sheet having at least two separated parallel slots extending in a given direction along a portion of said sheet; a first pair of curved electrodes secured to opposite surfaces of said sheet in registration with each other and positioned adjacent one end of said sheet, said electrodes having a focal point falling within a region of said sheet intermediate said slots; and a second pair of curved electrodes secured to opposite surfaces of said sheet in registration with each other and positioned adjacent the other end of said sheet, said second pair having another focal point falling within said region.

3. A device comprising a sheet of piezoelectric material, said sheet having at least two separated parallel slots extending in a given direction along a portion of said sheet; a pair of curved electrodes secured to opposite surfaces of said sheet in registration with each other and positioned adjacent one end of said sheet, said electrodes having a focal point falling within a region of said sheet intermediate said slots, and first and second terminations respectively secured to said one end and to the opposite end of said sheet, said terminations absorbing substantially without reflection any incident acoustical energy supplied thereto from said sheet.

4. A device comprising a sheet of piezoelectric material, said sheet having at least two separated parallel slots extending in a given direction along a portion of said sheet; a pair of curved electrodes secured to opposite surfaces of said sheet in registration with each other and positioned adjacent one end of said sheet, said electrodes having a focal point falling within a region of said sheet intermediate said slots, and electric field responsive means positioned adjacent said region and spaced apart from said electrodes.

5. A device comprising a sheet of piezoelectric material, said sheet having at least two separated parallel slots extending in a given direction along a portion of said sheet; a first pair of curved electrodes secured to opposite surfaces of said sheet in registration with each other and positioned adjacent one end of said sheet, said electrodes having a focal point falling within a region of said sheet intermediate said slots; a second pair of curved electrodes secured to opposite surfaces of said sheet in registration with each other and positioned adjacent the other end of said sheet, said second pair having another focal point falling within said region, and electric field responsive means positioned adjacent said region.

6. A device comprising a sheet of piezoelectric material, said sheet having at least two separated parallel slots extending in a given direction along a portion of said sheet; a pair of curved electrodes secured to opposite surfaces of said sheet in registration with each other and positioned adjacent one end of said slots, said electrodes having a focal point falling within a region of said sheet intermediate said slots; first and second terminations respectively secured to said one end and to the opposite end of said sheet, said terminations absorbing substantially without reflection any incident acoustical energy supplied thereto from said sheet, and electric field responsive means positioned adjacent said region and spaced apart from said curved electrodes.

7. A device comprising a sheet of piezoelectric material, said sheet having at least two separated parallel slots extending in a given direction along a portion of said sheet; a pair of curved electrodes secured to opposite surfaces of said sheet in registration with each other and positioned adjacent one end of said slots, said electrodes having a focal point falling within a region of said sheet intermediate said slots; first and second terminations respectively secured to said one end and to the opposite end of said sheet, said terminations absorbing substantially without reflection any incident acoustical energy supplied thereto from said sheet, and electric field responsive means positioned adjacent said region and spaced apart from said curved electrodes, said means including an electroluminescent layer in intimate engagement with said region.

8. A device comprising a sheet of piezoelectric material, said sheet having at least two separated parallel slots extending in a given direction along a portion of said sheet; a pair of curved electrodes secured to opposite surfaces of said sheet in registration with each other and positioned adjacent one end of said slots, said electrodes having a focal point falling within a region of said sheet intermediate said slots; first and second terminations respectively secured to said one end and to the opposite end of said sheet, said terminations absorbing substantially without reflection any incident acoustical energy supplied thereto from said sheet, and electric field responsive means positioned adjacent said region and spaced apart from said curved electrodes, said means including a pair of signal pick-off electrodes secured to opposite surfaces of said region adjacent the other end of said slots.

9. A device comprising a sheet of piezoelectric material, said sheet having at least two separated parallel slots extending in a given direction along a portion of said sheet; a pair of curved electrodes secured to opposite surfaces of said sheet in registration with each other and positioned adjacent one end of said slots, said electrodes having a focal point falling within a region of said sheet intermediate said slots; first and second terminations respectively secured to said one end and to the opposite end of said sheet, said terminations absorbing substantially without reflection any incident acoustical energy supplied thereto from said sheet, and electric field responsive means positioned adjacent said region and spaced apart from said curved electrodes, and means to apply a pulse between said curved electrodes.

10. A device comprising a sheet of piezoelectric material, said sheet having at least two separated parallel slots extending in a given direction along a portion of said sheet; a first pair of curved electrodes secured to opposite surfaces of said sheet in registration with each other and positioned adjacent one end of said sheet, said electrodes having a focal point falling within a region of said sheet intermediate said slots; a second pair of curved electrodes secured to opposite surfaces of said sheet in registration with each other and positioned adjacent the other end of said slots, said second pair having another focal point falling within said region; first and second terminations respectively secured to said one end and said other end of said sheet, said terminations absorbing substantially without reflection any incident acoustical energy supplied thereto from said sheet; and electric field responsive means positioned adjacent said region and spaced apart from both electrode pairs.

11. A device comprising a sheet of piezoelectric material, said sheet having at least two separated parallel slots extending in a given direction along a portion of said sheet; a first pair of curved electrodes secured to opposite surfaces of said sheet in registration with each other and positioned adjacent one end of said sheet, said electrodes having a focal point falling within a region of said sheet intermediate said slots; a second pair of curved electrodes secured to opposite surfaces of said sheet in registration with each other and positioned adjacent the other end of said slots, said second pair having another focal point falling within said region; first and second terminations respectively secured to said one end and said other end of said sheet, said terminations absorbing substantially without reflection any incident acoustical energy supplied thereto from said sheet; electric field responsive means positioned adjacent said region and spaced apart from both electrode pairs; and means to apply first and second pulses in timed relation to said first and second pairs of electrodes respectively.

12. In combination, a sheet of piezoelectric material, said sheet having a plurality of vertically displaced slots extending horizontally along a portion of said sheet, whereby a separate region of said sheet is subtended by each two adjacent slots and a plurality of pairs of curved electrodes separately associated with corresponding regions and positioned adjacent one end of said sheet, the electrodes in each pair being secured to opposite surfaces of said sheet in registration with each other and having a focal point falling within the corresponding region.

13. In combination, a sheet of piezoelectric material, said sheet having a plurality of vertically displaced slots extending horizontally along a portion of said sheet, whereby a separate region of said sheet is subtended by each two adjacent slots and a plurality of pairs of curved electrodes separately associated with corresponding regions and positioned adjacent one end of said sheet, the electrodes in each pair being secured to opposite surfaces of said sheet in registration with each other and having a focal point falling within the corresponding region, and a plurality of electric field responsive means positioned adjacent the corresponding region and spaced apart from the corresponding electrode pair.

References Cited in the file of this patent

UNITED STATES PATENTS

| | | |
|---|---|---|
| 2,505,364 | McSkimin | Apr. 25, 1950 |
| 2,626,992 | Holman | Jan. 27, 1953 |
| 2,649,550 | Hardie et al. | Aug. 18, 1953 |
| 2,672,590 | McSkimin | Mar. 16, 1954 |
| 2,816,236 | Rosen | Dec. 10, 1957 |